United States Patent
Dubinin et al.

(10) Patent No.: US 10,761,256 B2
(45) Date of Patent: Sep. 1, 2020

(54) BACKLIGHT UNIT PROVIDING UNIFORM LIGHT AND DISPLAY APPARATUS INCLUDING THE SAME

(71) Applicant: SAMSUNG ELECTRONICS CO., LTD., Suwon-si (KR)

(72) Inventors: German B. Dubinin, Krasnogorsk (RU); Sergey E. Dubynin, Moscow (RU); Aleksander V. Morozov, Podolsk (RU); Andrey N. Putilin, Moscow (RU); Sergey S. Kopenkin, Moscow (RU); Yuriy P. Borodin, Moscow (RU); Jungkwuen An, Suwon-si (KR); Chilsung Choi, Suwon-si (KR); Hongseok Lee, Seoul (KR); Hoon Song, Yongin-si (KR); Sunil Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/374,318

(22) Filed: Apr. 3, 2019

(65) Prior Publication Data

US 2019/0317264 A1  Oct. 17, 2019

(30) Foreign Application Priority Data

Apr. 16, 2018  (RU) ................................ 2018113739
Feb. 18, 2019  (KR) ........................ 10-2019-0018841

(51) Int. Cl.
*F21V 8/00* (2006.01)
*G02F 1/13357* (2006.01)
(Continued)

(52) U.S. Cl.
CPC .......... *G02B 6/0031* (2013.01); *G02B 5/0252* (2013.01); *G02B 5/18* (2013.01); *G02F 1/133602* (2013.01); *G09G 3/22* (2013.01)

(58) Field of Classification Search
CPC ........ G02B 6/0031; G02B 6/0016–002; G02B 2027/0105–0147; G02B 27/0172; G02B 5/18; G02B 5/0252; G02F 2201/30–307
See application file for complete search history.

(56) References Cited

U.S. PATENT DOCUMENTS 5,796,897 A  8/1998  Ronan
6,580,529 B1  6/2003  Amitai et al.
(Continued)

FOREIGN PATENT DOCUMENTS

CN  101196590 A  6/2008
CN  103777266 A  5/2014
(Continued)

OTHER PUBLICATIONS

US 9,632,316 B2, 04/2017, Levola (withdrawn)
Communication dated Nov. 9, 2018, issued by the Russian Patent Office in counterpart Russian Application No. 2018113739.

*Primary Examiner* — Mariceli Santiago
(74) *Attorney, Agent, or Firm* — Sughrue Mion, PLLC

(57) ABSTRACT

Provided is a backlight unit including a light source emitting coherent light, a light guide plate propagating the light emitted by the light source, an input grating inputting the light from the light source into the light guide plate, an output grating provided on one surface of the light guide plate and diffracting light incident from inside the light guide plate and outputting the light, in a direction toward the outside of the light guide plate, a first recuperation element provided on one surface of the light guide plate and including a first recycle grating, and a second recuperation element provided opposite to the first recuperation element and
(Continued)

directing, to the first recuperation element, incident light that is propagating inside the light guide plate.

16 Claims, 11 Drawing Sheets

(51) Int. Cl.
*G09G 3/22* (2006.01)
*G02B 5/18* (2006.01)
*G02B 5/02* (2006.01)

(56) References Cited

U.S. PATENT DOCUMENTS

| | | |
|---|---|---|
| 6,750,996 B2 | 6/2004 | Jagt et al. |
| 7,320,521 B2 | 1/2008 | Mihalakis |
| 7,530,693 B2 | 5/2009 | Mihalakis |
| 8,354,806 B2 | 1/2013 | Travis et al. |
| 8,582,206 B2 | 11/2013 | Travis |
| 8,736,963 B2 | 5/2014 | Robbins et al. |
| 8,985,803 B2 | 3/2015 | Bohn |
| 9,164,290 B2 | 10/2015 | Robbins et al. |
| 9,164,351 B2 | 10/2015 | Bohn |
| 9,304,235 B2 | 4/2016 | Sainiemi et al. |
| 9,372,347 B1 | 6/2016 | Levola et al. |
| 9,459,451 B2 | 10/2016 | Saarikko et al. |
| 9,494,799 B2 | 11/2016 | Robbins et al. |
| 9,513,480 B2 | 12/2016 | Saarikko et al. |
| 9,535,253 B2 | 1/2017 | Levola et al. |
| 9,563,269 B2 | 2/2017 | Travis |
| 9,664,905 B2 | 5/2017 | Bohn et al. |
| 9,671,615 B1 | 6/2017 | Vallius et al. |
| 9,759,913 B2 | 9/2017 | Saarikko et al. |
| 9,766,464 B2 | 9/2017 | Poon et al. |
| 9,791,696 B2 | 10/2017 | Woltman et al. |
| 9,864,208 B2 | 1/2018 | Vallius et al. |
| 9,910,276 B2 | 3/2018 | Vallius et al. |
| 9,927,614 B2 | 3/2018 | Vallius |
| 9,946,072 B2 | 4/2018 | Vallius |
| 10,038,840 B2 | 7/2018 | Vallius |
| 10,073,278 B2 | 9/2018 | Vallius |
| 10,191,196 B2 | 1/2019 | Morozov et al. |
| 10,192,358 B2 | 1/2019 | Robbins |
| 10,234,686 B2 | 3/2019 | Vallius |
| 10,241,332 B2 | 3/2019 | Vallius |
| 10,534,176 B1* | 1/2020 | Chi ................. G02B 6/0055 |
| 2004/0004767 A1* | 1/2004 | Song ................ G02B 27/0081 359/566 |
| 2004/0253003 A1 | 12/2004 | Farmer et al. |
| 2008/0137366 A1 | 6/2008 | Liu et al. |
| 2010/0128051 A1 | 5/2010 | Mizuta et al. |
| 2011/0242298 A1 | 10/2011 | Bathiche et al. |
| 2011/0242670 A1* | 10/2011 | Simmonds .......... G02B 5/0833 359/633 |
| 2011/0279426 A1 | 11/2011 | Imamura et al. |
| 2014/0176528 A1 | 6/2014 | Robbins |
| 2014/0240341 A1 | 8/2014 | Oda |
| 2015/0084928 A1 | 3/2015 | Wyrwas et al. |
| 2016/0077338 A1 | 3/2016 | Robbins et al. |
| 2016/0147003 A1 | 5/2016 | Morozov et al. |
| 2016/0231567 A1 | 8/2016 | Saarikko et al. |
| 2016/0313695 A1 | 10/2016 | Futterer |
| 2016/0327906 A1 | 11/2016 | Futterer |
| 2016/0351114 A1 | 12/2016 | Lee |
| 2017/0003505 A1 | 1/2017 | Vallius et al. |
| 2017/0090089 A1* | 3/2017 | Kim ..................... G02B 6/005 |
| 2017/0102543 A1 | 4/2017 | Vallius |
| 2017/0115487 A1 | 4/2017 | Travis |
| 2017/0255813 A1 | 9/2017 | Chen et al. |
| 2017/0307886 A1* | 10/2017 | Stenberg ............. G02B 5/1814 |
| 2017/0315346 A1* | 11/2017 | Tervo ................ G02B 27/0172 |
| 2018/0003994 A1 | 1/2018 | Grey et al. |
| 2018/0157042 A1* | 6/2018 | Wall ................. G02B 27/0172 |
| 2018/0172995 A1* | 6/2018 | Lee .................. G02B 27/0172 |
| 2018/0217305 A1 | 8/2018 | Valera |
| 2019/0004321 A1 | 1/2019 | Grey et al. |
| 2019/0113825 A1* | 4/2019 | Alexander ............. G02F 1/313 |
| 2019/0265486 A1* | 8/2019 | Hansotte ............. G02B 26/101 |

FOREIGN PATENT DOCUMENTS

| | | |
|---|---|---|
| CN | 203773081 U | 8/2014 |
| CN | 106575034 A | 4/2017 |
| EP | 2 936 237 | 6/2014 |
| EP | 3 066 518 | 5/2015 |
| EP | 2 887 128 A1 | 6/2015 |
| EP | 2 467 752 B1 | 11/2015 |
| EP | 3 195 045 | 3/2016 |
| EP | 3 197 339 | 3/2016 |
| EP | 3 014 340 B1 | 3/2017 |
| EP | 3 175 280 B1 | 4/2018 |
| GB | 2529003 A | 2/2016 |
| GB | 2543119 A | 4/2017 |
| KR | 10-2004-0039400 A | 5/2004 |
| KR | 10-2012-0127077 A | 11/2012 |
| KR | 10-2016-0060522 A | 5/2016 |
| KR | 10-2017-0036508 A | 4/2017 |
| RU | 2 419 888 C1 | 5/2011 |
| RU | 2 496 152 C2 | 10/2013 |
| RU | 2014 146 782 A | 6/2016 |
| WO | 2014/100549 A1 | 6/2014 |
| WO | 2014/210349 A1 | 12/2014 |
| WO | 2015/041894 A1 | 3/2015 |
| WO | 2015/069553 A1 | 5/2015 |
| WO | 2015/145119 A1 | 10/2015 |
| WO | 2016/020643 A1 | 2/2016 |
| WO | 2016/044193 A1 | 3/2016 |
| WO | 2016/048729 A1 | 3/2016 |
| WO | 2016/113528 A1 | 7/2016 |
| WO | 2016/130342 A1 | 8/2016 |
| WO | 2016/130343 A1 | 8/2016 |
| WO | 2016/130359 A1 | 8/2016 |
| WO | 2016/130369 A1 | 8/2016 |
| WO | 2016/198832 A1 | 12/2016 |
| WO | 2017/003674 A1 | 1/2017 |
| WO | 2017/003795 A1 | 1/2017 |
| WO | 2017/019227 A1 | 2/2017 |
| WO | 2017/019228 A1 | 2/2017 |
| WO | 2017/034765 A1 | 3/2017 |
| WO | 2017/062139 A1 | 4/2017 |
| WO | 2017/062167 A1 | 4/2017 |
| WO | 2017/074820 A1 | 5/2017 |
| WO | 2017/083160 A1 | 5/2017 |
| WO | 2017/087209 A1 | 5/2017 |
| WO | 2017/095641 A1 | 6/2017 |
| WO | 2017/105868 A1 | 6/2017 |
| WO | 2017/116637 A1 | 7/2017 |
| WO | 2017/155729 A1 | 9/2017 |

* cited by examiner

BACKLIGHT UNIT PROVIDING UNIFORM LIGHT AND DISPLAY APPARATUS INCLUDING THE SAME

CROSS-REFERENCE TO RELATED APPLICATIONS

This application claims priority from Russian Patent Application No. 2018113739, filed on Apr. 16, 2018 in the Russian Patent Office and Korean Patent Application No. 10-2019-0018841, filed on Feb. 18, 2019 in the Korean Intellectual Property Office, the disclosures of which are incorporated herein in their entireties by reference.

BACKGROUND

1. Field

Example embodiments of the present disclosure relate to backlight units providing uniform light and display apparatuses including the same.

2. Description of the Related Art

Currently, backlight units are designed to minimize the thickness thereof, and one approach therefor is an edge-emitting backlight.

In the case of an edge-emitting backlight unit, a light source is arranged on a side portion of a light guide plate, and the light from the light source propagates inside the light guide plate and is output through a light output surface that is an upper surface of the light guide plate. Some light thereof is not output through the light output surface and is lost through another side portion of the light guide plate.

The luminance of the output light, the uniformity thereof, and the efficiency at which the light from the light source is output through the light output surface are major factors in forming a high-quality image using the light of the backlight unit. However, using a powerful light source to improve nonuniform luminance or inefficiency may be power-consuming and may be undesirable in the environment of a mobile device.

SUMMARY

One or more example embodiments provide backlight units with improved uniformity and light efficiency.

One or more example embodiments also provide display apparatuses forming high-quality images by using backlight units with improved uniformity and light efficiency.

Additional aspects will be set forth in part in the description which follows and, in part, will be apparent from the description, or may be learned by practice of example embodiments.

According to an aspect of an example embodiment, there is provided a backlight unit including a light source configured to emit light, a light guide plate including a first surface, a second surface that is opposite to the first surface in a first direction, a third surface, and a fourth surface that is opposite to the third surface in a second direction, the second direction being different from the first direction, an input grating provided on the light guide plate adjacent to the third surface, the input grating being configured to input the light emitted by the light source into the light guide plate such that the light input is totally reflected inside of the light guide plate, an output grating provided on one of the first surface and the second surface of the light guide plate, the output grating being configured to diffract light that is incident on the output grating from inside of the light guide plate and output the light toward an outside of the light guide plate, a first recuperation element provided on the one of the first surface and the second surface of the light guide plate and adjacent to the fourth surface, the first recuperation element including a first recycle grating, and a second recuperation element provided on the other one of the first surface and the second surface of the light guide plate opposite to the first recuperation element in the first direction, the second recuperation element being configured to direct, to the first recuperation element, the light propagating inside the light guide plate that is incident on the second recuperation element.

The light propagating inside the light guide plate may include direct propagating light that does not propagate through the first recuperation element and the second recuperation element, and recuperation propagating light that propagates through at least one of the first recuperation element and the second recuperation element, and wherein the first recuperation element and the second recuperation element may be configured such that the recuperation propagating light has a certain path difference from the direct propagating light.

The first recuperation element may be configured to diffract the recuperation propagating light toward the inside of the light guide plate, and the first recycle grating may be configured to maximize negative second-order diffracted light directed toward the inside of the light guide plate.

The output grating may include a diffraction pattern that is configured to output the direct propagating light and the recuperation propagating light in parallel to each other.

The diffraction pattern may be set such that an intensity distribution trend of the direct propagating light output through the output grating and an intensity distribution trend of the recuperation propagating light output through the output grating are opposite to each other in a direction from the input grating to the first recuperation element.

The second recuperation element may include a mirror.

The second recuperation element may include a second recycle grating.

The output grating, the first recycle grating, and the second recycle grating may be coated with mirror.

The backlight unit may further include a dichroic layer provided on the first surface or the second surface of the light guide plate, the dichroic layer being configured to reflect light of a certain wavelength band, the dichroic layer may be further configured to reflect, back toward the output grating, light that is not output to the outside of the light guide plate from among the light incident on the output grating.

The dichroic layer may be further configured to reflect light incident on the dichroic layer at a certain angle.

The dichroic layer may be further configured to reflect negative first-order diffracted light that is diffracted by the output grating.

One of the output grating and the dichroic layer may be provided on the first surface of the light guide plate and the other of the output grating and the dichroic layer may be provided on the second surface of the light guide plate.

The output grating may include a relief pattern, and the dichroic layer may be provided on the relief pattern.

The backlight unit may further include an immersion layer covering the relief pattern, wherein the dichroic layer may be provided on the immersion layer opposite to the relief pattern.

The backlight unit may further include a mirror layer provided on the first surface or the second surface of the light guide plate, the mirror layer may be configured to reflect, back toward the output grating, light that is not output to the outside of the light guide plate from among the light incident on the output grating.

According to an aspect of another example embodiment, there is provided a display apparatus including a light source configured to emit light, a light guide plate including a first surface, a second surface that is opposite to the first surface in a first direction, a third surface, and a fourth surface that is opposite to the third surface in a second direction, the second direction being different from the first direction, an input grating provided on the light guide plate adjacent to the third surface, the input grating being configured to input the light emitted by the light source into the light guide plate such that the light input is totally reflected inside of the light guide plate, an output grating provided on one of the first surface and the second surface of the light guide plate, the output grating being configured to diffract light that is incident on the output grating from inside of the light guide plate and output the light toward an outside of the light guide plate, a first recuperation element provided on the one of the first surface and the second surface of the light guide plate and adjacent to the fourth surface, the first recuperation element including a first recycle grating, and a second recuperation element provided on the other one of the first surface and the second surface of the light guide plate opposite to the first recuperation element in the first direction, the second recuperation element being configured to direct, to the first recuperation element, the light propagating inside the light guide plate that is incident on the second recuperation element, and a spatial light modulator configured to form a hologram image based on the light from the backlight unit.

According to an aspect of another example embodiment, there is provided a backlight unit including a light source configured to emit light of a certain wavelength band, a light guide plate including a first surface, a second surface that is opposite to the first surface in a first direction, a third surface and a fourth surface that is opposite to the third surface in a second direction, the second direction being different from the first direction, an input grating provided on the light guide plate adjacent to the third surface, the input grating being configured to input the light emitted by the light source into the light guide plate such that the light input is totally reflected inside of the light guide plate, an output grating provided on one of the first surface or the second surface, the output grating being configured to diffract light that is incident on the output grating from inside of the light guide plate and output the light in a direction toward an outside of the light guide plate, and a dichroic layer provided on the first surface or the second surface of the light guide plate, the dichroic layer being configured to reflect light of the certain wavelength that is incident on the first surface or the second surface, at an angle smaller than a critical angle of total internal reflection of the light guide plate, toward the output grating.

The backlight unit may further including a first recuperation element provided on one of the first surface and the second surface and adjacent to the fourth surface, the first recuperation element may include a first recycle grating, and a second recuperation element provided opposite to the first recuperation element in the first direction, the second recuperation element being configured to direct, to the first recuperation element, light propagating inside the light guide plate that is incident on the second recuperation element.

The light propagating inside the light guide plate may include direct propagating light that does not propagate through the first recuperation element and the second recuperation element, and recuperation propagating light that propagates through at least one of the first recuperation element and the second recuperation element, and the first recuperation element and the second recuperation element may be configured such that the recuperation propagating light has a certain path difference from the direct propagating light.

The first recuperation element may be configured to diffract the recuperation propagating light toward an inside of the light guide plate, and the first recycle grating may be configured to maximize negative second-order diffracted light directed toward the inside of the light guide plate.

The output grating may include a diffraction pattern that is configured to output the direct propagating light and the recuperation propagating light in parallel to each other.

The diffraction pattern may be configured such that an intensity distribution trend of the direct propagating light output through the output grating and an intensity distribution trend of the recuperation propagating light output through the output grating are opposite to each other in a direction from the input grating to the first recuperation element.

The second recuperation element may include a mirror.

The second recuperation element may include a second recycle grating.

The output grating, the first recycle grating, and the second recycle grating may be mirror-coated.

The dichroic layer may be further configured to reflect negative first-order diffracted light that is diffracted by the output grating.

One of the output grating and the dichroic layer may be provided on the first surface of the light guide plate and the other one of the output grating and the dichroic layer is provided on the second surface of the light guide plate.

The output grating may include a relief pattern, and the dichroic layer may be provided on the relief pattern.

The output grating may include a relief pattern, wherein the backlight unit may further include an immersion layer covering the relief pattern, and wherein the dichroic layer is provided on the immersion layer opposite to the relief pattern.

According to an aspect of another example embodiment, there is provided a display apparatus including a light source configured to emit light of a certain wavelength band, a light guide plate including a first surface, a second surface that is opposite to the first surface in a first direction, a third surface and a fourth surface that is opposite to the third surface in a second direction, the second direction being different from the first direction, an input grating provided on the light guide plate adjacent to the third surface, the input grating being configured to input the light emitted by the light source into the light guide plate such that the light input is totally reflected inside of the light guide plate, an output grating provided on one of the first surface or the second surface, the output grating being configured to diffract light that is incident on the output grating from inside of the light guide plate and output the light in a direction toward an outside of the light guide plate, and a dichroic layer provided on the first surface or the second surface of the light guide plate, the dichroic layer being configured to reflect light of the certain wavelength that is incident on the first surface or the second surface, at an angle smaller than a critical angle of total internal reflection of the light guide plate, toward the output grating, and a spatial light modulator configured to form a hologram image based on the light from the backlight unit.

The output grating may include a relief pattern, wherein the backlight unit may further include an immersion layer covering the relief pattern, wherein the dichroic layer is provided between the immersion layer and the light guide plate.

The output grating may include a relief pattern, and wherein the dichroic layer is provided on the light guide plate opposite to the relief pattern in the first direction.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
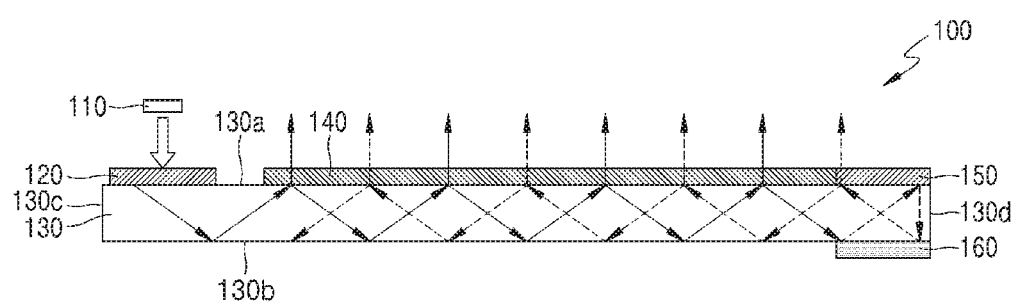
FIG. 1 is a cross-sectional view illustrating a schematic structure of a backlight unit according to an example embodiment.

Reference will now be made in detail to example embodiments of which are illustrated in the accompanying drawings, wherein like reference numerals refer to like elements throughout. In this regard, example embodiments may have different forms and should not be construed as being limited to the descriptions set forth herein. Accordingly, example embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments of the present disclosure will be described in detail with reference to the accompanying drawings. In the drawings, like reference numerals may denote like elements, and the size of each element may be exaggerated for clarity and convenience of description. The embodiments described below are merely examples, and various modifications may be made therein.

As used herein, the terms "over" or "on" may include not only "directly over" or "directly on" but also "indirectly over" or "indirectly on".

As used herein, the singular forms "a", "an", and "the" are intended to include the plural forms as well, unless the context clearly indicates otherwise. Also, when something is referred to as "including" or "comprising" a component, another component may be further included unless specified otherwise.

Also, the operations of a method described herein may be performed in any suitable order unless otherwise indicated herein or otherwise clearly contradicted by the context. The method is not limited to the described order of the operations. All examples or example terms (e.g., "such as") provided herein are merely intended to describe the technical concept of the present disclosure in detail, and the scope of the present disclosure is not limited by the examples or example terms unless otherwise defined in the following claims.

Figure 2:
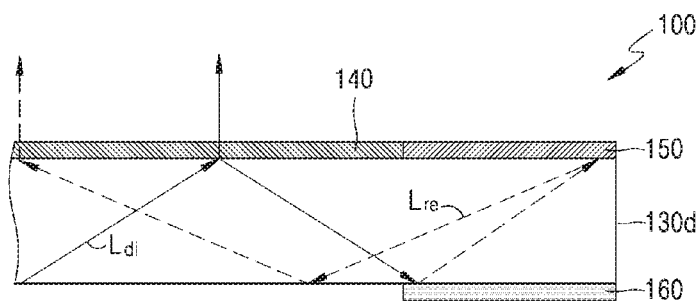
FIG. 2 is an enlarged cross-sectional view illustrating in detail a partial region of FIG. 1.
Figure 3:
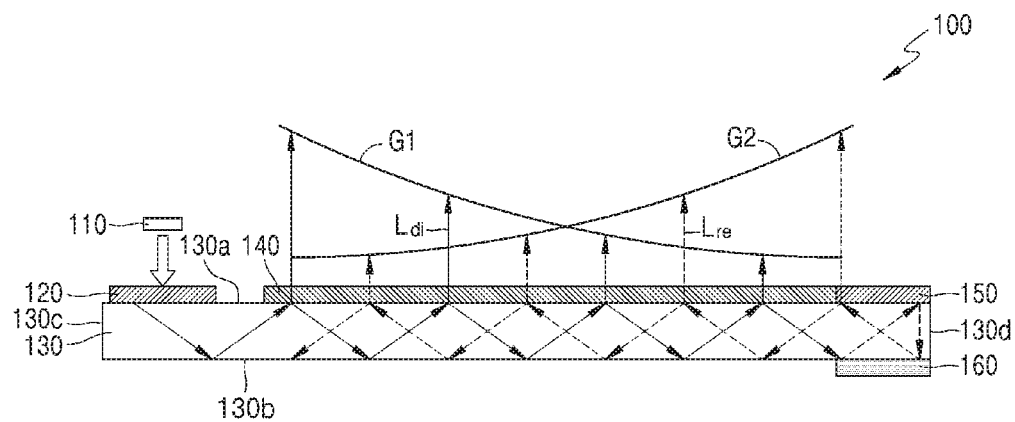
FIG. 3 is a conceptual diagram illustrating a principle by which the backlight unit of FIG. 1 outputs uniform light.

FIG. 1 is a cross-sectional view illustrating a schematic structure of a backlight unit according to an example embodiment, FIG. 2 is an enlarged cross-sectional view illustrating in detail a partial region of FIG. 1, and FIG. 3 is a conceptual diagram illustrating a principle in which the backlight unit of FIG. 1 outputs uniform light.

A backlight unit 100 may include a light source 110, an input grating 120 for inputting the light from the light source 110 into a light guide plate 130, the light guide plate 130 for propagating the input light, an output grating 140 for outputting the light propagating in the light guide plate 130 outside the light guide plate 130, and a light recuperation module for preventing or reducing light from being lost at one side portion of the light guide plate 130.

The light source 110 may provide a coherent light beam. For example, a laser diode for generating a light with high coherence may be used as the light source 110, but embodiments are not limited thereto. For example, various light emitting devices, such as light emitting diode (LEDs), having coherence may be used as the light source 110.

The light guide plate 130 may include a first surface 130a and a second surface 130b facing each other in a first direction and a third surface 130c and a fourth surface 130d facing each other in a second direction different from the first direction. Referring to FIG. 1, the first direction is a vertical direction and the second direction is a horizontal direction. In the following description, the first surface 130a and the second surface 130b may be referred to as an upper surface and a lower surface, respectively, and the third surface 130c and the fourth surface 130d may be referred to as a left edge and a right edge, respectively.

The input grating 120 may be arranged adjacent to the third surface 130c. Although it is illustrated that the input grating 120 is arranged adjacent to the left edge on the upper surface of the light guide plate 130, embodiments are not limited thereto. For example, the input grating 120 may be arranged adjacent to the left edge on the lower surface of the light guide plate 130, or the input grating 120 may be arranged on the third surface 130c.

The input grating 120 may input the light from the light source 110 in a total reflection direction inside the light guide plate. That is, the input grating 120 may input the light on the first surface 130a or the second surface 130b of the light guide plate 130 with an incident angle so that total reflection occurs on the surface of the light guide plate 130. The input grating 120 may include a diffractive optical element for diffracting and transmitting a portion of light. The detailed form or arrangement position of the input grating 120 may be determined by considering the position of the light source 110. The position of the light source 110 is not limited to the illustrated position, and may be located at any position near the left edge of the light guide plate 130.

The output grating 140 may be arranged on any one of the first surface 130a and the second surface 130b of the light guide plate 130, and may output the light input and propagated inside the light guide plate 130, in a direction facing outside the light guide plate 130. The output grating 140 may include a diffractive optical element for diffracting and transmitting a portion of light. Although it is illustrated that the output grating 140 is arranged on the upper surface of the light guide plate 130, example embodiments are not limited thereto, and the output grating 140 may be arranged on the lower surface of the light guide plate 130. The upper surface of the light guide plate 130, that is, the first surface 130a, is illustrated as a light output surface, and the position of the light output surface is defined as a surface in a direction facing a viewer. The light exiting the light guide plate 130 through a surface other than the light output surface may become a lost light that may not be effectively used.

Whenever the light input into the light guide plate 130 through the input grating 120, is totally-reflected inside the light guide plate 130 and propagated inside the light guide plate 130 is incident to the output grating 140, a portion of the light may be diffracted and output through the output grating 140 and the remaining light, for example, non-diffracted light or 0th-order diffracted light, may continue to propagate toward the right edge of the light guide plate 130.

The light recuperation module may include a first recuperation element 150 arranged adjacent to the right edge on the first surface 130a of the light guide plate 130 and a second recuperation element 160 arranged adjacent to the right edge on the second surface 130b of the light guide plate 130. The positions of the first recuperation element 150 and the second recuperation element 160 are not limited thereto and may be reversed.

The first recuperation element 150 may include a recycle grating for reuse of light. The first recuperation element 150 may be configured to return an input light propagated from the left side to the right side of the light guide plate 130 back to the left side to recuperate the input light into the light guide plate 130. The recycle grating included in the first recuperation element 150 may diffract the input light in a total reflection direction inside the light guide plate 130. The recycle grating included in the first recuperation element 150 may be coated with a reflection member, for example, a mirror.

The second recuperation element 160 may be arranged to face the first recuperation element 150 and may direct most of the input light propagating inside the light guide plate 130 toward the first recuperation element 150. For this purpose, the second recuperation element 160 may be configured to reflect or diffract light.

The gratings included in the backlight unit 100, for example, the input grating 120, the output grating 140, and the recycle gratings of the first recuperation element 150, may provide a desired change in the phase of an input light, and thus, may have various forms for performing operations such as divergence, convergence, and collimation on light by changing the shape of a wavefront of light. For example, the gratings may exhibit various diffraction patterns, and may include a relief-phase grating having a physical relief pattern. The relief-phase grating may induce various light changes by adjusting a surface profile thereof. In order to exhibit a desired diffraction pattern, the gratings may be implemented as a hologram where an interference pattern for diffracting light is recorded. The gratings may include any mediums for securing a phase change of an incident wave by a refractive index change, for example, materials such as liquid crystals and polymers. The above gratings may be manufactured by, for example, lithography and holographic recording.

Referring to FIG. 2, since the backlight unit 100 according to an example embodiment includes the light recuperation module, the light propagating inside the light guide plate 130 may include a light passing through the light recuperation module and a light not passing through the light recuperation module. That is, for example, the light propagating inside the light guide plate 130 may include a direct propagating light $L_{di}$ that does not passes through the first recuperation element 150 and the second recuperation element 160, and a recuperation propagating light $L_{re}$ that propagates through at least one of the first recuperation element 150 and the second recuperation element 160. The first recuperation element 150 and the second recuperation element 160 may be configured such that the recuperation propagating light $L_{re}$ may have a certain path difference with respect to the direct propagating light $L_{di}$. The light reaching the first recuperation element 150 and the second recuperation element 160 is light which has not been output by the output grating 140. The light input to the first recuperation element 150 through the second recuperation element 160, without being output by the output grating 140, may be directed back to the inside of the light guide plate 130 while forming a certain angle with an input direction thereof. The recuperation propagating light $L_{re}$ may have a certain path difference with respect to the direct propagating light $L_{di}$ and may be output outside the light guide plate 130 through the output grating 140 after being input back to the output grating 140 while propagating inside the light guide plate 130.

In order to form such a light path, the diffraction pattern of the recycle grating included in the first recuperation element 150 may be set to maximize negative second-order diffracted light directed to the inside of the light guide plate 130. For example, as for the profile of the grating surface of the recycle grating, the depth of the relief pattern or the duty cycle thereof (i.e., the ratio between a convex surface and a concave surface of the surface profile) may be calculated for optimization of negative second-order diffraction. These parameters may be adjusted to obtain a desired profile for diffraction efficiency.

The output grating 140 may include a diffraction pattern for outputting the direct propagating light $L_{di}$ and the recuperation propagating light $L_{re}$ in parallel to each other. Accordingly, the lights output through various paths from inside the light guide plate 130 may have a uniform directivity. The diffraction pattern of the output grating 140 may be set such that the intensity distribution trend of the output light of the direct propagating light $L_{di}$ output through the output grating 140 and the intensity distribution trend of the output light of the recuperation propagating light $L_{re}$ that are output through the output grating 140 may be opposite to each other. Referring to FIG. 3, the intensity distribution trend of the output light of the direct propagating light $L_{di}$ is represented by a trend line G1 and the intensity distribution trend of the output light of the recuperation propagating light $L_{re}$ is represented by a trend line G2. As represented by the trend line G1, the intensity of the output light of the direct propagating light $L_{di}$ may gradually decrease in a direction from the left side to the right side of the light guide plate 130, that is, in a direction that is away from the input grating 120 and is parallel to the first surface 130a of the light guide plate 130. Further, as represented by the trend line G2, the intensity of the output light of the recuperation propagating light $L_{re}$ may gradually increase from the left side to the right side of the light guide plate 130. As such, the total output light corresponding to the sum of the output light of the direct propagating light $L_{di}$ and the output light of the recuperation propagating light $L_{re}$ may be uniform as a whole.

Each of the output grating 140 and the recycle grating of the first recuperation element 150 may have a uniform grating period. It may also be possible to provide the uniformity of the output light by using a nonuniform grating period, that is, a grating period varying according to positions.

As described above, the arrangement positions, sizes, and detailed forms of the output grating 140 and the recycle grating of the first recuperation element 150 may be determined by considering the uniformity, collimation, and coherency of the output light, but are not limited to the illustrated positions, sizes, and forms. Also, the wavelength band of the light output from the light source 110 may be considered to optimize the input grating 120, the output grating 140, and the recycle grating of the first recuperation element 150.

Figure 4:
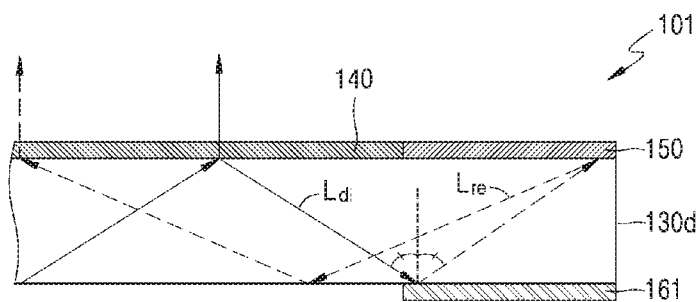
FIG. 4 is a cross-sectional view illustrating in detail a partial region of a backlight unit according to an example embodiment.

FIG. 4 is a cross-sectional view illustrating in detail a partial region of a backlight unit according to an example embodiment.

A backlight unit 101 of the example embodiment may include a second recuperation element 161 including a mirror. The light incident on the second recuperation element 161 may be reflected in a single path having an reflection angle equal to an incidence angle, may reach the first recuperation element 150, and may be directed back to the inside of the light guide plate 130 by the recycle grating of the first recuperation element 150. The backlight unit 101 may output the direct propagating light $L_{di}$ and the recuperation propagating light $L_{re}$ recuperated in the above path.

Figure 5:
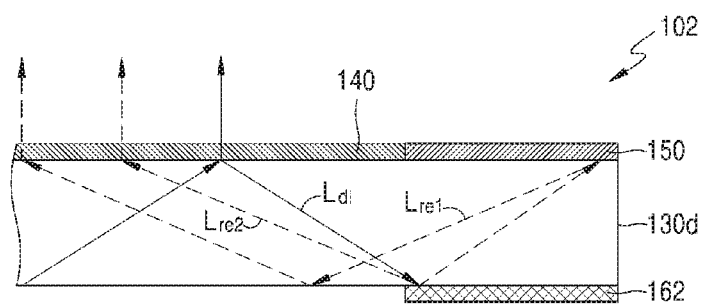
FIG. 5 is a cross-sectional view illustrating in detail a partial region of a backlight unit according to an example embodiment.

FIG. 5 is a cross-sectional view illustrating in detail a partial region of a backlight unit according to another embodiment.

A backlight unit 102 of an example embodiment may differ from the backlight unit 101 of FIG. 4 in that a second recuperation element 162 includes a recycle grating. The second recuperation element 162 may diffract the incident light not only in a direction toward the first recuperation element 150 but also in a direction directly toward the inside of the light guide plate 130. The recycle grating of the second recuperation element 162 may have a pattern optimized for a particular order of diffraction. For example, it may be optimized for the diffraction in a direction toward the first recuperation element 150 and in a direction directly toward the inside of the light guide plate 130. As illustrated, recuperation propagating lights $L_{re1}$ and $L_{re2}$ of two paths may be formed by the second recuperation element 162 including the recycle grating, and the backlight unit 102 may be more efficient than the backlight unit 101 of FIG. 4 in terms of light recuperation. The number and paths of illustrated recuperation propagating lights $L_{re1}$ and $L_{re2}$ are merely examples, and more recuperation propagating lights of various paths may be formed. Like the recycle grating of the first recuperation element 150, the recycle grating of the second recuperation element 162 may also be mirror-coated. In this case, positive first-order diffracted light diffracted by the recycle grating of the second recuperation element 162 may be reflected from the mirror coating and directed to the first recuperation element 150 together with the negative first-order diffracted light.

Figure 6:
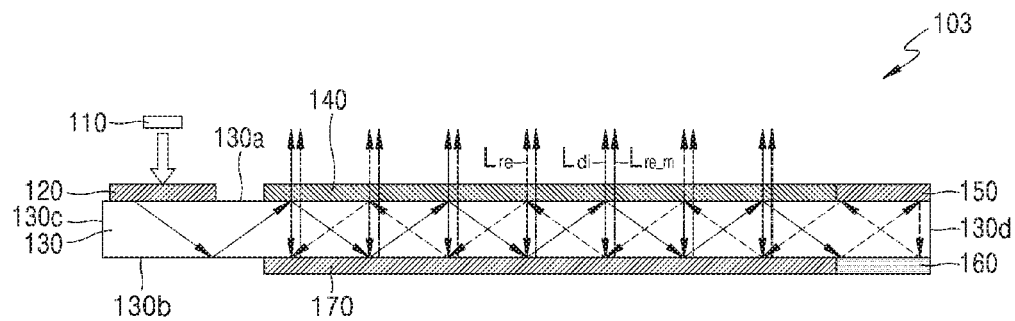
FIG. 6 is a cross-sectional view illustrating a schematic structure of a backlight unit according to an example embodiment.

FIG. 6 is a cross-sectional view illustrating a schematic structure of a backlight unit according to an example embodiment.

A backlight unit 103 of the example embodiment may differ from the backlight unit 100 of FIG. 1 in that a mirror 170 is further formed on the lower surface of the light guide plate 130, that is, on the second surface 130b.

In the backlight unit 103 of the example embodiment, the mirror 170 may prevent or reduce the light loss through the second surface 130b of the light guide plate 130.

The total reflection of light inside the light guide plate 130 may occur when the incidence angle of light on the second surface 130b by the input grating 120 is greater than a total reflection critical angle. A portion of the light passing through the input grating 120 may not satisfy this condition, and this light may not be totally reflected, that is, a portion of the light reaching the second surface 130b may be lost outside the light guide plate 130 through the second surface 130b. The mirror 170 arranged on the second surface 130b may reflect light that is not totally reflected by the second surface 130b in a direction toward the output grating 140.

The output grating 140 may have a diffraction pattern for outputting the input light outside the light guide plate 130. However, some light thereof may not be output by the output grating 140 as a result of negative first-order diffraction and may reach the second surface 130b of the light guide plate 130 at an angle smaller than the total reflection critical angle, for example, in a substantially vertical incidence direction, and this light may be output and lost outside the light guide plate 130 through the second surface 130b. The mirror 170 arranged on the second surface 130b may reflect the light incident on the second surface 130b in a substantially vertical incidence direction in a direction toward the output grating 140.

In FIG. 6, this recuperation light by the mirror 170 is denoted by $L_{re\_m}$. The output light of the backlight unit 103 may include the direct propagating light $L_{di}$, the recuperation propagating light $L_{re}$, and the recuperation light $L_{re\_m}$ by the mirror 170. The additional inclusion of the mirror 170 may improve the light efficiency thereof and may further improve the luminance of the output light.

Figure 7:
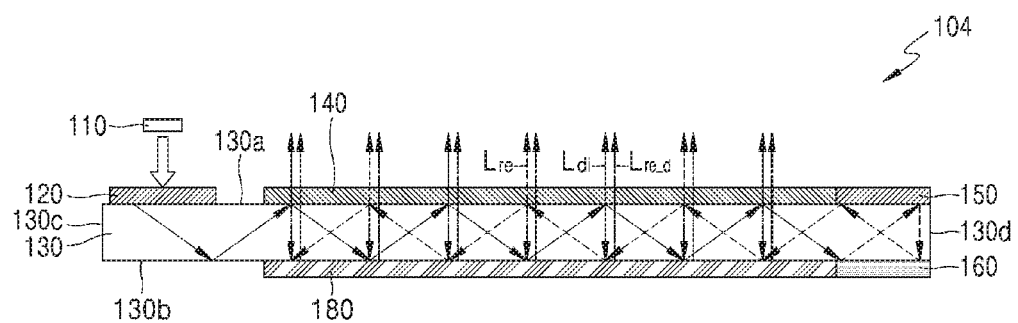
FIG. 7 is a cross-sectional view illustrating a schematic structure of a backlight unit according to an example embodiment.
Figure 8:
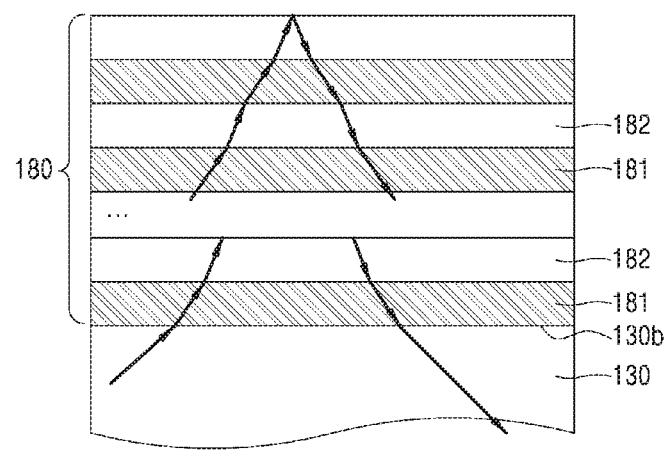
FIG. 8 is a cross-sectional view conceptually illustrating a detailed structure of a dichroic layer provided in the backlight unit of FIG. 7 and a light path thereof.

FIG. 7 is a cross-sectional view illustrating a schematic structure of a backlight unit according to an example embodiment, and FIG. 8 is a cross-sectional view conceptually illustrating a detailed structure of a dichroic layer provided in the backlight unit of FIG. 7 and a light path thereof.

A backlight unit 104 of the example embodiment may differ from the backlight unit 103 of FIG. 6 in that a dichroic layer 180 is arranged on the lower surface of the light guide plate 130, that is, on the second surface 130b.

The dichroic layer 180 may reflect, back to the output grating 140, the light that is directed to the lower surface of the light guide plate 130 without being output outside the light guide plate 130 from the output grating 140. For example, the dichroic layer 180 may reflect the lights that are substantially vertically incident on the second surface 130b of the light guide plate 130 as a result of negative first-order diffraction from the output grating 140, in a direction toward the output grating 140. In FIG. 7, this recuperation light by the dichroic layer 180 is denoted by $L_{re\_d}$. The output light of the backlight unit 104 may include the direct propagating light $L_{di}$, the recuperation propagating light $L_{re}$, and the recuperation light $L_{re\_d}$ by the dichroic layer 180. The additional inclusion of the dichroic layer 180 may further improve the light efficiency and the luminance of the output light.

The dichroic layer 180 may be optimized for a light of a particular wavelength and may have, for example, an optimized structure for the wavelength band of the light output from the light source 110. As illustrated in FIG. 8, the dichroic layer 180 may have a structure in which a first layer 181 and a second layer 182 including materials having different refractive indexes are alternately arranged a plurality of times.

As illustrated in FIG. 8, the operation of the dichroic layer 180 may be based on the phenomenon of multipath interference by a multilayer optical structure. In the dichroic layer 180, the first layer 181 having a relatively high refractive index and the second layer 182 having a relatively low refractive index may be alternately arranged a plurality of times. The thickness of each layer may be set to cause the reflection at the boundary between the layers, the constructive interference with the light of a particular angle and a particular wavelength in the multipath of a transmitted light, and the destructive interference with the remaining light. Thus, the light incident on the second surface 130b of the light guide plate 130 at an angle not causing total reflection may be transmitted through the second surface 130b and then input back into the light guide plate 130 by the multipath interference at the dichroic layer 180.

The backlight unit 104 of the example embodiment including the dichroic layer 180 may exhibit a higher light efficiency than the backlight unit 103 of FIG. 6 including the mirror 170. This is because the mirror 170 generally causes loss associated with the absorption at a metal-dielectric boundary.

The backlight unit 104 of the example embodiment may include the dichroic layer 180 instead of a mirror to maintain the overall internal reflection with little absorption at the boundary of each layer. Accordingly, the light efficiency may be improved and the luminance of the output light may be improved.

The dichroic layer 180 may be more efficient in that it may optimize the reflection of the light incident at a particular angle and a particular wavelength. For example, since the dichroic layer 180 may reflect only the light of a certain wavelength band that is vertically incident as a result of the negative first-order diffraction at the output grating 140, the light incident on the dichroic layer 180 at a different incidence angle and/or a different wavelength may not be reflected. That is, the dichroic layer 180 may be substantially transparent for this light. As such, since the thickness of each layer of the dichroic layer 180 may be set such that the light of a wavelength band output from the light source 110 may be reflected only when this light is incident at a particular angle, a higher light efficiency may be achieved for a light of a desired wavelength band and the luminance of the output light may be improved.

The dichroic layer 180 may be implemented by chemical vapor deposition, ion-beam sputtering, or magnetron sputtering.

Figure 9:
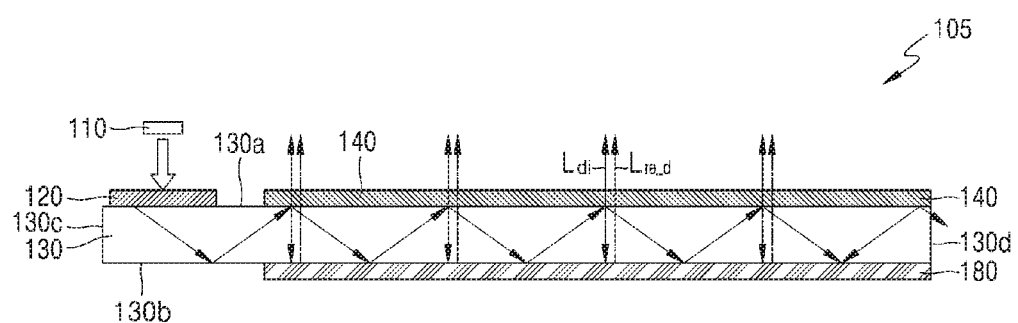
FIG. 9 is a cross-sectional view illustrating a schematic structure of a backlight unit according to an example embodiment.

FIG. 9 is a cross-sectional view illustrating a schematic structure of a backlight unit according to an example embodiment.

Figure 10:
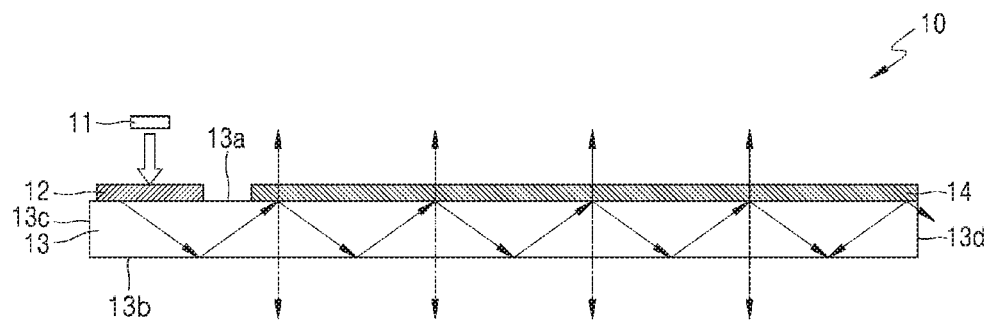
FIG. 10 is a cross-sectional view illustrating a schematic structure of a backlight unit according to a related example.

A backlight unit 105 of the example embodiment may differ from the backlight unit 100 of FIG. 1 in that a dichroic layer 180 is additionally provided on the lower surface of the light guide plate 130 and no light recuperation module is provided. For example, as illustrated in FIG. 10, the output grating 140 and the dichroic layer 180 may be provided facing each other on upper surface 130a and lower surface 130b of the light guide plate 130, respectively, adjacent to the fourth surface 130d. The light output outside the backlight unit 130 may include the direct propagating light $L_{di}$ and the recuperation light $L_{re\_d}$ by the dichroic layer 180.

FIG. 10 is a cross-sectional view illustrating a schematic structure of a backlight unit according to a related example.

A backlight unit 10 of a related example may include a light source 11, a light guide plate 13, an input grating 12, and an output grating 14. The light guide plate 13 may include two surfaces 13a and 13b facing each other and the input grating 12 and the output grating 14 may be arranged on one surface 13a thereamong. The light guide plate 13 may include a left surface 13c and a right surface 13d facing each other, and the input grating 12 may be arranged adjacent to the left surface 13c of the light guide plate 13.

The light from the light source 11 may be incident on the input grating 12 and may be diffracted and directed to the light guide plate 13 at an angle causing total internal reflection in the light guide plate 13. The light propagating inside the light guide plate 13 may be partially diffracted at the output grating 14 and then output outside the light guide plate 13, and may be partially directed in the opposite direction. This light may be a lost light because it is output through the lower surface of the light guide plate 130, which is a surface other than the light output surface.

A light loss may also occur through the right surface 13d of the light guide plate 130. The light that propagates inside the light guide plate 13 may be partially output whenever it meets the output grating 14, and the light that is not output may continue to propagate toward the right surface 13*d* inside the light guide plate 130. The number of times the light meets the output grating 14 may be limited, for example, only tens of times. Also, since the efficiency of the output grating 14 may be generally very low, the output grating 14 may not output all the light input through the input grating 12. Thus, some light thereof may necessarily reach the right surface 13*d* and exit outside of the light guide plate 13.

As such, due to the lost light exiting through the lower surface 13*b* and the right surface 13*d* of the light guide plate 130, the light efficiency may be reduced and the luminance of the output light may be reduced.

Also, the intensity of the light propagating inside the light guide plate 13 may be reduced whenever it is incident on the output grating 14. Thus, at each successive incidence, the intensity of the light output through the output grating 14 may become lower than the intensity of the previously output light. That is, intensity of the output light from the light guide plate 13 may non-uniform and decrease in a direction away from the input grating 120 from the left side to the right side of the light guide plate 13.

Figure 11:
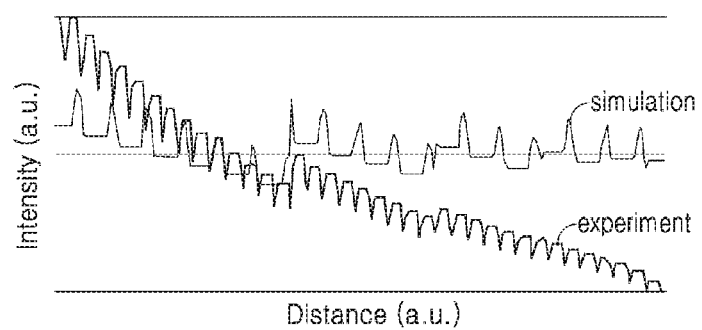
FIG. 11 is a graph illustrating an intensity distribution of light output by a backlight unit according to a related example.

FIG. 11 is a graph illustrating an intensity distribution of an output light by a backlight unit according to a related example.

Two curves of the graph are respectively the results of simulation and experiment, and the distance thereof is a distance in a direction away from the input grating 120 from the left side to the right side of the light guide plate 13. The intensity of the output light decreases with the distance, and this trend is stronger in the experimental results than in the calculated results.

Figure 12:
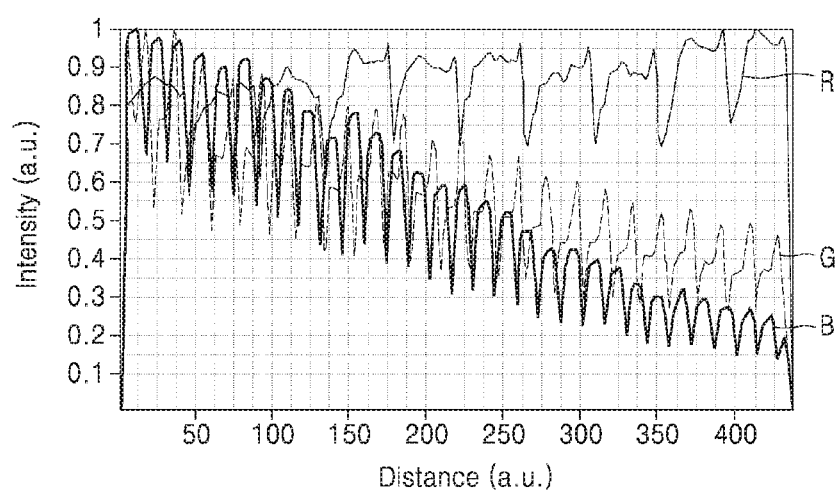
FIG. 12 is a graph illustrating an intensity distribution of light output by a backlight unit according to a related example with respect to light of different wavelengths.

FIG. 12 is a graph illustrating an intensity distribution of an output light by a backlight unit according to a related example with respect to lights of different wavelengths.

As seen from the curves of the graph, the intensity distribution of the output light is different for different wavelengths. The trend of reducing the intensity of the output light according to the distance increase occurs more strongly in ascending order of red light R, green light G, and blue light B, that is, the output light is less uniform.

The trend shown in FIGS. 11 and 12 may be compensated by changing the efficiency of the output grating 14, but adjusting only the output grating 14 may have a limited effect due to the wavelength-dependent loss of light and the diffusion of the incidence angle.

Also, when the light to be lost is simply reflected at the edge of the light guide plate 13 and recuperated as a scattered light into the light guide plate 13, this light may become a noise light and the quality of an image formed by using this light may be degraded.

Unlike the backlight unit 10 of the related example, the backlight unit of example embodiments may include a light recuperation module and/or a dichroic layer for maintaining the coherency thereof while improving the collimation and uniformity of the output light. The backlight unit according to example embodiments may prevent or reduce the noise due to the recuperated light, and thus may provide the light capable of forming a high-quality image.

Figure 13:
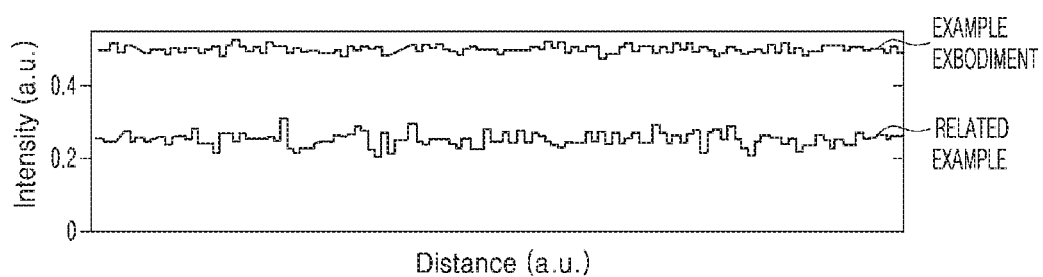
FIG. 13 is a graph illustrating a comparison between intensity distributions of output light of backlight units according to the example embodiment of FIG. 1 and a related example.

FIG. 13 is a graph illustrating a comparison between intensity distributions of output lights of backlight units according to an example embodiment and a related example.

Two curves of the graph respectively relate to the backlight unit 100 of FIG. 1 according to an example embodiment and the backlight unit 10 of FIG. 10 according to a related example. In the example embodiment including the light recuperation module, the uniformity of the output light is improved, and the intensity of the output light is increased by about two times compared to the related example. Also, the spatial uniformity thereof may be seen from the difference between a ridge and a furrow in the graph, and in the case of the example embodiment, the difference between the ridge and the furrow is smaller than that of the related example. The degree of uniformity of the example embodiment is about 90%.

Table 1 shows the comparison of the color-by-color efficiency of example embodiments with that of a comparative example.

TABLE 1

| Color | Related Example | Example Embodiment 1 | | Example Embodiment 2 | |
| --- | --- | --- | --- | --- | --- |
| | | Recycle Efficiency | Efficiency | Recycle Efficiency | Efficiency |
| Red | ~5 ... 7% | ~60% | ~10 ... 15% | ~70% | ~15% |
| Green | ~5 ... 7% | ~40% | ~10% | ~40% | ~10% |
| Blue | ~5 ... 7% | ~20% | ~10% | ~20% | ~10% |

In Table 1, Example Embodiment 1 relates to the backlight unit 101 of FIG. 4 including a mirror as a second recuperation element 160, Embodiment 2 relates to the backlight unit 102 of FIG. 5 including a recycle grating as a second recuperation element 160, and Related Example relates to the backlight unit 10 of FIG. 10 according to a related example.

The two example embodiments exhibit an improved efficiency over the related example. In comparison of Example Embodiment 1 with Example Embodiment 2, it can be seen that there is a slightly improved efficiency increase in Example Embodiment 2 that is the backlight unit 102 of FIG. 5 in which a recycle grating is included in each of the first recuperation element 150 and the second recuperation element 160.

Figure 14:
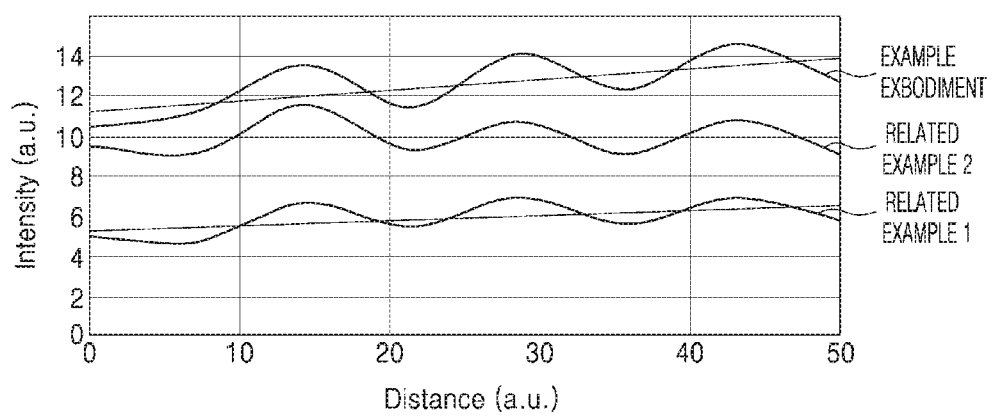
FIG. 14 is a graph illustrating a comparison between intensity distributions of output light of backlight units according to the example embodiment of FIG. 9 and related examples.

FIG. 14 is a graph illustrating a comparison between intensity distributions of output lights of backlight units according to an example embodiment of FIG. 9 and related examples.

In the graph, Related Example 1 relates to the backlight unit 10 of FIG. 10 according to a related example, Related Example 2 relates to an example where a silver mirror coating is added to the lower surface of the backlight unit 10 of FIG. 10, and Example Embodiment relates to the backlight unit 105 of FIG. 9.

Referring to FIG. 14, in comparison with Related Example 1 of the backlight unit 10 having no coating on the lower surface of the light guide plate 13, the intensity of the output light increases by about two times in Related Example 2 where a silver mirror coating is added, and an additional power improvement of about 20% or more occurs in the Example Embodiment where the dichroic layer 180 is added.

As such, all of the backlight units of example embodiments including a light recuperation module or a dichroic layer may have an improved performance over the related examples.

Also, in the backlight unit 104 of FIG. 7 of the example embodiment including both the light recuperation module and the dichroic layer, the light use efficiency may be increased by about two times, the luminance may be improved, and the spatial uniformity of the output light may be improved by about 12.5%.

Hereinafter, backlight units according to example embodiments will be described with reference to FIGS. 15, 16, 17, and 18. The example embodiments to be described may relate to various forms of output gratings, and this modification may also be applied to the embodiment of FIG. 9 not including a light recuperation module, as well as to the embodiment of FIG. 7 including a light recuperation module.

Figure 15:
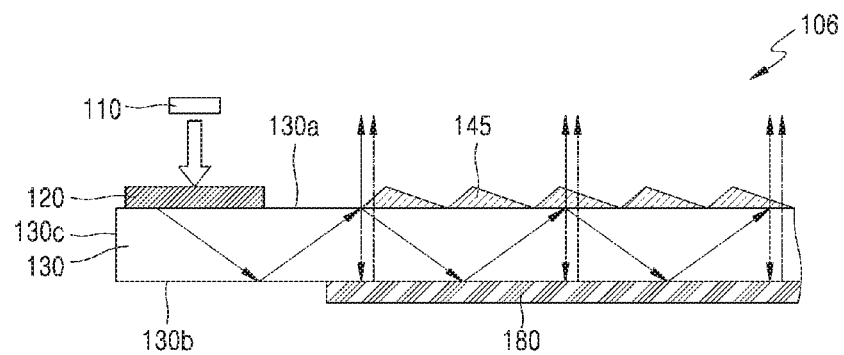
FIG. 15 is a cross-sectional view illustrating a schematic structure of a backlight unit according to an example embodiment.

FIG. 15 is a cross-sectional view illustrating a schematic structure of a backlight unit according to an example embodiment.

A backlight unit 106 may include a light source 110, a light guide plate 130, an input grating 120, an output grating 145, and a dichroic layer 180. The output grating 145 may include a relief pattern, for example, in a saw-tooth pattern. The output grating 145 may be arranged on the first surface 130*a* of the light guide plate 130 and the dichroic layer 180 may be arranged on the second surface 130*b* facing the first surface 130*a*. The light diffracted in a direction toward the second surface 130*b* of the light guide plate 130 without being output through the output grating 145 may be directed back to the output grating 140 by the dichroic layer 180 and output outside the light guide plate 130.

Figure 16:
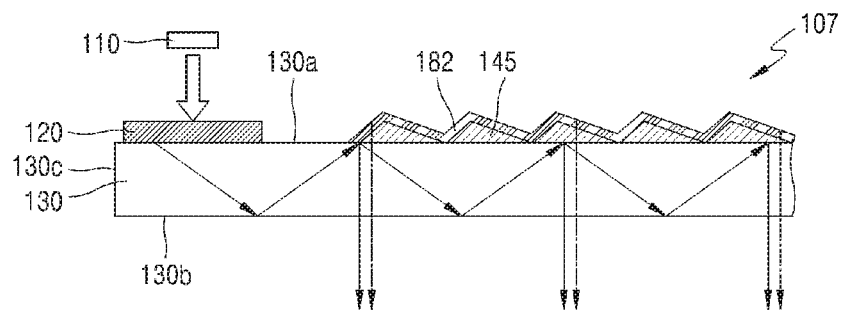
FIG. 16 is a cross-sectional view illustrating a schematic structure of a backlight unit according to an example embodiment.

FIG. 16 is a cross-sectional view illustrating a schematic structure of a backlight unit according to an example embodiment.

A backlight unit 107 of the example embodiment may differ from the backlight unit 106 of FIG. 15 in that a dichroic layer 182 is formed along the surface of the output grating 145. The output grating 145 may include a relief pattern, and the dichroic layer 182 may be arranged on the relief pattern along the surface of the relief pattern.

In the backlight unit 107 of the example embodiment, the lower surface of the light guide plate 130, that is, the second surface 130*b*, may be a light output surface. The light diffracted from the output grating 145 and directed toward the second surface 130*b* may be output outside the light guide plate 130. The light diffracted from the output grating 145 toward the opposite side of the second surface 130*b* as the light output surface may be reflected from the dichroic layer 182, directed back to the second surface 130*b*, and output outside the light guide plate 130.

Figure 17:
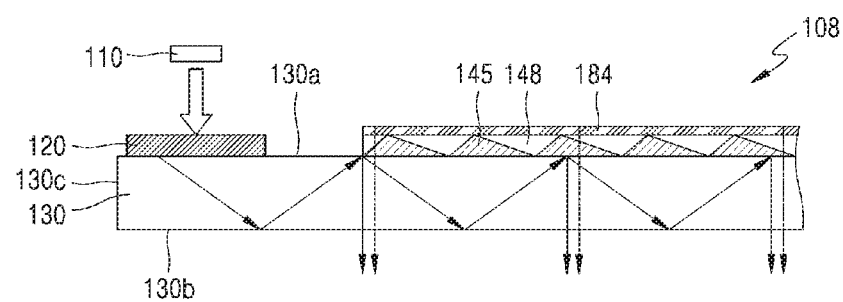
FIG. 17 is a cross-sectional view illustrating a schematic structure of a backlight unit according to an example embodiment.

FIG. 17 is a cross-sectional view illustrating a schematic structure of a backlight unit according to an example embodiment.

A backlight unit 108 of the example embodiment may differ from the backlight unit 107 of FIG. 16 in that an immersion layer 148 is further provided to cover a relief pattern constituting the output grating 145 and a dichroic layer 184 is arranged on the immersion layer 148.

The immersion layer 148 may include a polymer material and may entirely cover and smooth the relief pattern constituting the output grating 140. For example, the immersion layer 148 may be formed by applying an ultraviolet (UV)-curable polymer material and planarizing the resulting structure by using a stamp.

Figure 18:
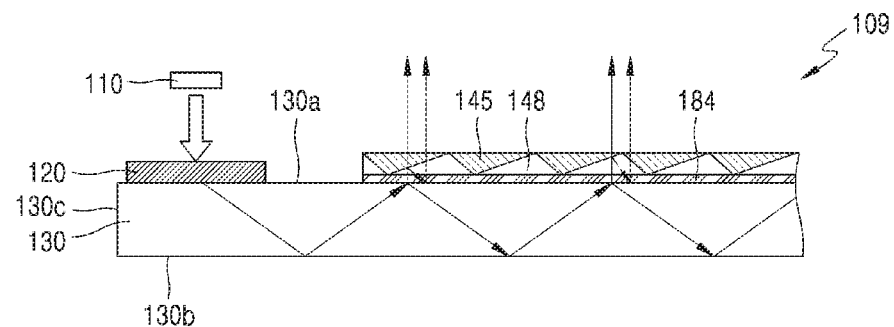
FIG. 18 is a cross-sectional view illustrating a schematic structure of a backlight unit according to an example embodiment.

FIG. 18 is a cross-sectional view illustrating a schematic structure of a backlight unit according to an example embodiment.

A backlight unit 109 of the example embodiment may be similar to the backlight unit 108 of FIG. 17 in that an immersion layer 148 is provided to cover a relief pattern forming the output grating 145 and a dichroic layer 184 is arranged on the immersion layer 148, but may be different from the backlight unit 108 of FIG. 17 in that the dichroic layer 184 is located between the immersion layer 148 and the first surface 130*a*, and in contact with the first surface 130*a* of the light guide plate 130.

Figure 19:
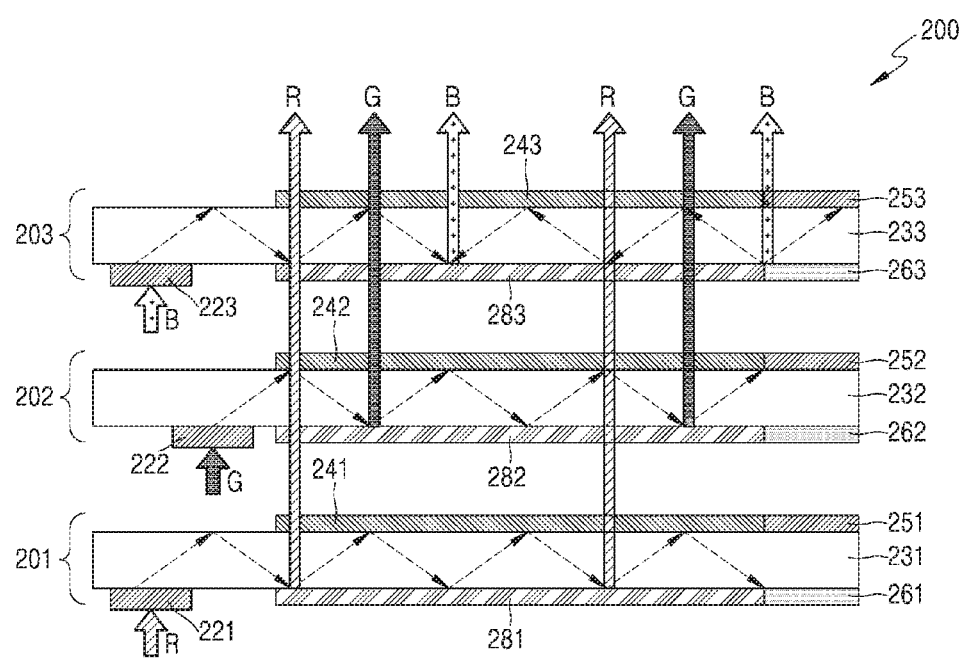
FIG. 19 is a cross-sectional view illustrating a schematic structure of a backlight unit according to an example embodiment.

FIG. 19 is a cross-sectional view illustrating a schematic structure of a backlight unit according to an example embodiment.

A backlight unit 200 of the example embodiment may include a plurality of light guide plate structures 201, 202, and 203, for example, first light guide plate structure 201, second light guide plate structure 202, and third light guide plate structure 203, arranged in a stack form, and each of the first light guide plate structure 201, the second light guide plate structure 202, and the third light guide plate structure 203 may be similar to the structure provided in the backlight unit of the above example embodiments.

The first light guide plate structure 201 may include a light guide plate 231, an input grating 221, an output grating 241, a dichroic layer 281, a first recuperation element 251, and a second recuperation element 261. A light of a first wavelength band, for example, a red light R, may be incident on the first light guide plate structure 201. The input grating 221, the output grating 241, the dichroic layer 281, the first recuperation element 251, and the second recuperation element 261 included in the first light guide plate structure 201 may have an optimized structure for the light of the first wavelength band.

The second light guide plate structure 202 may include a light guide plate 232, an input grating 222, an output grating 242, a dichroic layer 282, a first recuperation element 252, and a second recuperation element 262. A light of a second wavelength band, for example, a green light G, may be incident on the second light guide plate structure 202. The input grating 222, the output grating 242, the dichroic layer 282, the first recuperation element 252, and the second recuperation element 262 included in the second light guide plate structure 202 may have an optimized structure for the light of the second wavelength band.

The third light guide plate structure 203 may include a light guide plate 233, an input grating 223, an output grating 243, a dichroic layer 283, a first recuperation element 253, and a second recuperation element 263. A light of a third wavelength band, for example, a blue light B, may be incident on the third light guide plate structure 203. The input grating 223, the output grating 243, the dichroic layer 283, the first recuperation element 253, and the second recuperation element 263 included in the third light guide plate structure 203 may have an optimized structure for the light of the third wavelength band.

As described above, the gratings included in the first light guide plate structure 201, the second light guide plate structure 202, and the third light guide plate structure 203 may be optimized by constructing a profile required for each grating. In general, the intensity of the output light by the output grating decreases with the distance, and this trend is different for light of different wavelengths. For example, since the emission intensity of a green light and a blue light tend to decrease more greatly than that of a red light, the distribution of the diffraction efficiency in which each of the output gratings 241, 242, and 243 outputs a recuperation propagating light may be optimized to be compensated to a greater extent in the case of the blue light and the green light than in the case of the red light.

The dichroic layers 281, 282, and 283 may be manufactured by a method to reflect only desired wavelengths, i.e., a red light, a green light, and a blue light, respectively, and to be transparent for lights of other wavelengths.

This multilayered backlight unit 200 may more accurately optimize the characteristics of the grating and the dichroic layer separately in each of a plurality of layers for lights of different wavelengths, and thus, further improve the light efficiency and the uniformity of the output light.

The number of stacked layers of the illustrated backlight unit 200 is not limited to three, and for example, more light guide plate structures optimized for lights of different wavelengths and/or additional wavelengths may be used.

Figure 20:
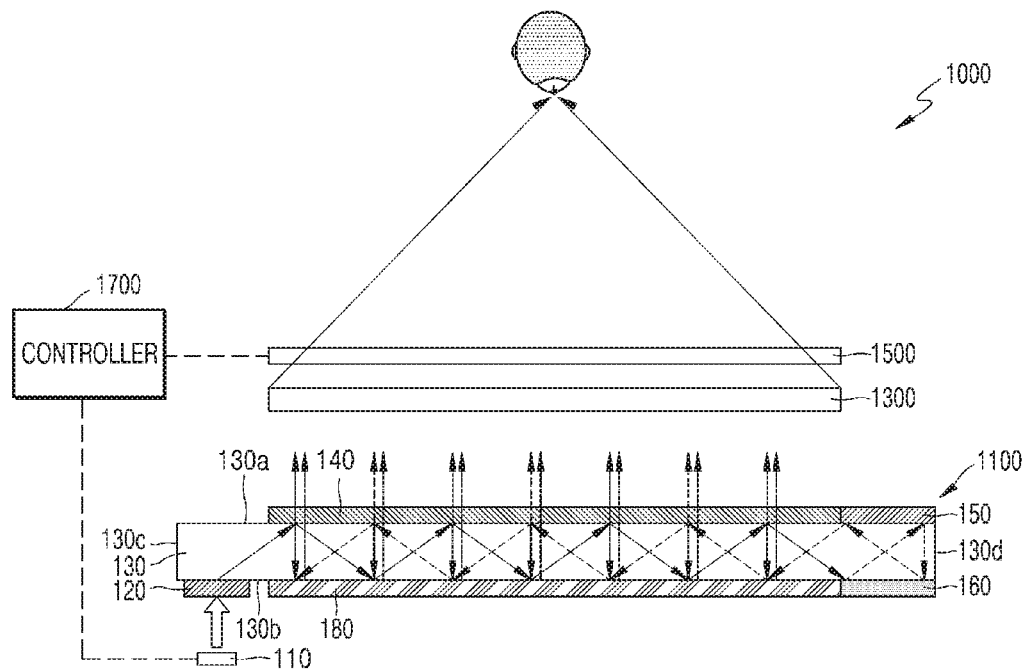
FIG. 20 is a cross-sectional view illustrating a schematic structure of a display apparatus according to an example embodiment.

FIG. 20 is a cross-sectional view illustrating a schematic structure of a display apparatus according to an example embodiment.

A display apparatus 1000 may include a backlight unit 1100 and a spatial light modulator 1500 for forming a hologram image using the light from the backlight unit 1100. Also, the display apparatus 1000 may further include a field lens 1300 for focusing the hologram image on a certain space and a controller 1700 for applying a control signal to the spatial light modulator 1500.

The backlight unit 1100 may include any one of the backlight units according to the above example embodiments, any combination thereof, or any modification thereof and is not limited to the illustrated forms.

The spatial light modulator 1500 may form a hologram image by using the light provided by the backlight unit 1100. The spatial light modulator 1500 may include a liquid crystal display (LCD) panel. The spatial light modulator 1500 may form a hologram pattern having an interference pattern for modulating an incident light. The hologram pattern may be a computer-generated hologram formed according to the control signal of the controller 1700. By the diffraction and modulation of the light incident on the spatial light modulator 1500 by the hologram pattern, a hologram image may be reproduced at a position in a certain space.

The field lens 1300 may focus the hologram image formed by the spatial light modulator 1500 on a certain space, and may include a Fresnel lens or a liquid crystal lens. The position of the field lens 1300 is not limited to the illustrated position, and for example, it may be interchanged with the position of the spatial light modulator 1500.

Also, the display apparatus 1000 may further include a beam deflector for controlling the propagation direction of a light beam output from the backlight unit 1100. The beam deflector may control the direction of the light beam two-dimensionally such that the light beam is directed toward the viewer.

In addition, the display apparatus 1000 may further include an eye tracking sensor for tracking the position of the viewer.

Since the display apparatus 1000 may include the backlight unit 1100 providing lights of relatively high efficiency and high uniformity to form images of improved image quality with low power consumption, the display apparatus 1000 may also be suitably applied to mobile devices.

Although the display apparatus 1000 has been described as a holographic display apparatus, the display apparatus 1000 is not limited thereto and may be any type of three-dimensional display apparatus or any display apparatus for forming two-dimensional images.

The above backlight unit may include the light recuperation module and/or the dichroic layer to minimize the potential loss in the light guide plate, thus improving the light efficiency and providing lights with improved uniformity and luminance.

The display apparatus including the above backlight unit may form relatively high-quality images with low power consumption.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A backlight unit comprising:
a light source configured to emit light;
a light guide plate comprising a first surface, a second surface that is opposite to the first surface in a first direction, a third surface, and a fourth surface that is opposite to the third surface in a second direction, the second direction being different from the first direction;
an input grating provided on the light guide plate adjacent to the third surface, the input grating being configured to input the light emitted by the light source into the light guide plate such that the light input is totally reflected inside of the light guide plate;
an output grating provided on one of the first surface and the second surface of the light guide plate, the output grating being configured to diffract light that is incident on the output grating from inside of the light guide plate and output the light toward an outside of the light guide plate;
a first recuperation element provided on the one of the first surface and the second surface of the light guide plate and adjacent to the fourth surface, the first recuperation element comprising a first recycle grating; and
a second recuperation element provided on the other one of the first surface and the second surface of the light guide plate opposite to the first recuperation element in the first direction, the second recuperation element being configured to direct, to the first recuperation element, the light propagating inside the light guide plate that is incident on the second recuperation element.

2. The backlight unit of claim 1, wherein the light propagating inside the light guide plate comprises direct propagating light that does not propagate through the first recuperation element and the second recuperation element, and recuperation propagating light that propagates through at least one of the first recuperation element and the second recuperation element, and
wherein the first recuperation element and the second recuperation element are configured such that the recuperation propagating light has a certain path difference from the direct propagating light.

3. The backlight unit of claim 2, wherein the first recuperation element is configured to diffract the recuperation propagating light toward the inside of the light guide plate, and wherein the first recycle grating is configured to maximize negative second-order diffracted light directed toward the inside of the light guide plate.

4. The backlight unit of claim 2, wherein the output grating comprises a diffraction pattern that is configured to output the direct propagating light and the recuperation propagating light in parallel to each other.

5. The backlight unit of claim 4, wherein the diffraction pattern is set such that an intensity distribution trend of the direct propagating light output through the output grating and an intensity distribution trend of the recuperation propagating light output through the output grating are opposite to each other in a direction from the input grating to the first recuperation element.

6. The backlight unit of claim 1, wherein the second recuperation element comprises a mirror.

7. The backlight unit of claim 1, wherein the second recuperation element comprises a second recycle grating.

8. The backlight unit of claim 7, wherein the output grating, the first recycle grating, and the second recycle grating are mirror-coated.

9. The backlight unit of claim 1, further comprising a dichroic layer provided on the first surface or the second surface of the light guide plate, the dichroic layer being configured to reflect light of a certain wavelength band, wherein the dichroic layer is further configured to reflect, back toward the output grating, light that is not output to the outside of the light guide plate from among the light incident on the output grating.

10. The backlight unit of claim 9, wherein the dichroic layer is further configured to reflect light incident on the dichroic layer at a certain angle.

11. The backlight unit of claim 9, wherein the dichroic layer is further configured to reflect negative first-order diffracted light that is diffracted by the output grating.

12. The backlight unit of claim 9, wherein one of the output grating and the dichroic layer is provided on the first surface of the light guide plate and the other of the output grating and the dichroic layer is provided on the second surface of the light guide plate.

13. The backlight unit of claim 9, wherein the output grating comprises a relief pattern, and wherein the dichroic layer is provided on the relief pattern.

14. The backlight unit of claim 13, further comprising an immersion layer covering the relief pattern, wherein the dichroic layer is provided on the immersion layer opposite to the relief pattern.

15. The backlight unit of claim 1, further comprising a mirror layer provided on the first surface or the second surface of the light guide plate, the mirror layer being configured to reflect, back toward the output grating, light that is not output to the outside of the light guide plate from among the light incident on the output grating.

16. A display apparatus comprising:
a backlight unit comprising:
a light source configured to emit light;
a light guide plate comprising a first surface, a second surface that is opposite to the first surface in a first direction, a third surface, and a fourth surface that is opposite to the third surface in a second direction, the second direction being different from the first direction;
an input grating provided on the light guide plate adjacent to the third surface, the input grating being configured to input the light emitted by the light source into the light guide plate such that the light input is totally reflected inside of the light guide plate;
an output grating provided on one of the first surface and the second surface of the light guide plate, the output grating being configured to diffract light that is incident on the output grating from inside of the light guide plate and output the light toward an outside of the light guide plate;
a first recuperation element provided on the one of the first surface and the second surface of the light guide plate and adjacent to the fourth surface, the first recuperation element comprising a first recycle grating; and
a second recuperation element provided on the other one of the first surface and the second surface of the light guide plate opposite to the first recuperation element in the first direction, the second recuperation element being configured to direct, to the first recuperation element, the light propagating inside the light guide plate that is incident on the second recuperation element; and
a spatial light modulator configured to form a hologram image based on the light from the backlight unit.

* * * * *